J. HARRISON, Jr.
Car Truck.

No. 706.

2 Sheets—Sheet 1.

Patented Apr. 24, 1838.

J. HARRISON, Jr.

Car Truck.

No. 706.

2 Sheets—Sheet 2.

Patented Apr. 24, 1838.

UNITED STATES PATENT OFFICE.

JOSEPH HARRISON, JR., OF PHILADELPHIA, PENNSYLVANIA.

IMPROVEMENT IN CARS, CARRIAGES, TRUCKS, &c., FOR RAILROADS.

Specification forming part of Letters Patent No. 706, dated April 24, 1838.

*To all whom it may concern:*

Be it known that I, JOSEPH HARRISON, Jr., of the city of Philadelphia, Pennsylvania, have invented certain Improvements in the Construction of Cars, Carriages, or Trucks to Run upon Railroads, by which improvement it is intended to effect a more equal bearing of the wheels upon the rails than has been heretofore attained; and I do hereby declare that the following is a full and exact description thereof.

Figure 1:
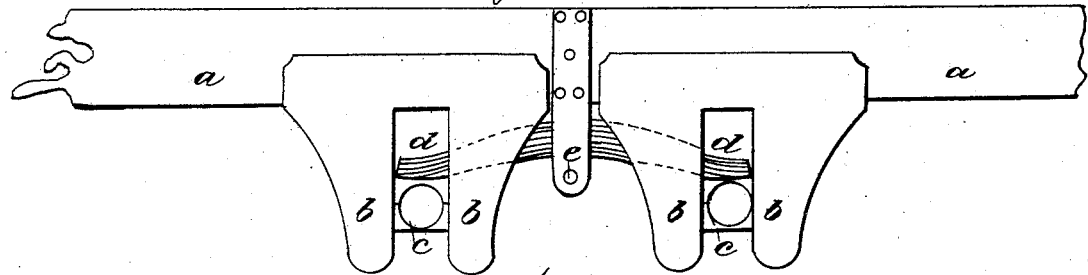

One of my modes of equalizing the bearing of the wheels is shown in Figure 1 of the accompanying drawings, in which $a\,a$ represent part of the frame-work of a locomotive-engine, car, or truck, with plumber-blocks $b\,b$ and sliding boxes $c\,c$ to receive the axles of the wheels. A spring $d\,d$ of the usual constrction is so mounted as to vibrate on its center, its ends resting upon the upper sides of the sliding boxes of the axles, by which arrangement it will be readily seen that the two wheels on each side may adapt themselves to the inequalities of the road without altering their relationship to the action of the spring.

Figure 2:
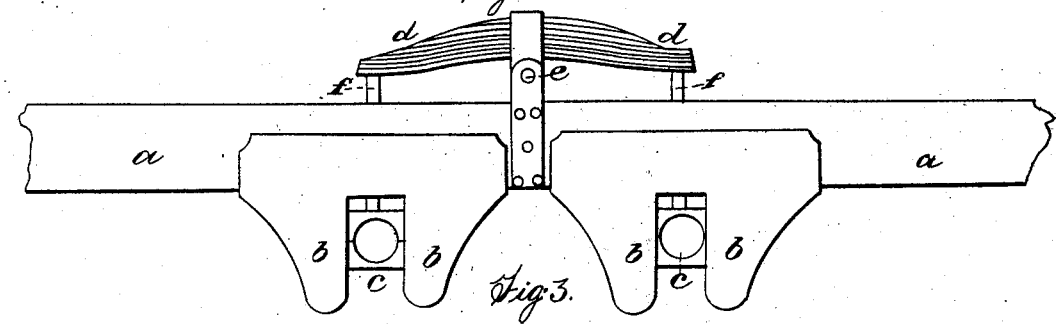

In Fig. 2 an arrangement is shown analogous to the foregoing, and the respective parts are designated by the same letters of reference. The plumber-blocks or pedestals and the sliding boxes are perfectly similar, but the spring is placed on the upper side of the frame, where it is allowed to vibrate on its center, as in the former case, its ends resting on the sliding rods $f\,f$, which extend down to the axle-boxes $c\,c$.

Figure 3:
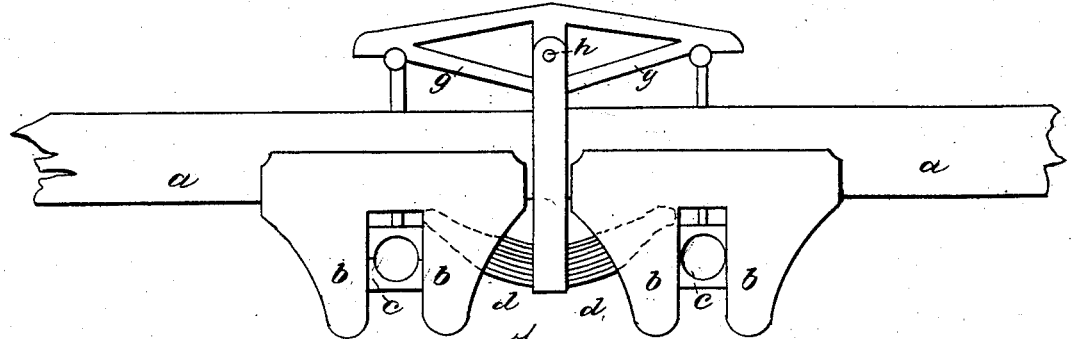

Fig. 3 exhibits an arrangement in which the spring is fixed so as to be stationary at its center and below the frame, the necessary vibration being obtained by the employment of a vibrating beam $g\,g$, connected with the sliding boxes in the manner in which the spring is connected in Fig. 2. $h$ is the center upon which the beam vibrates. The effect of this arrangement in equalizing the bearing of the wheels, it will be readily perceived, must be the same with that produced by the two former.

Figure 4:
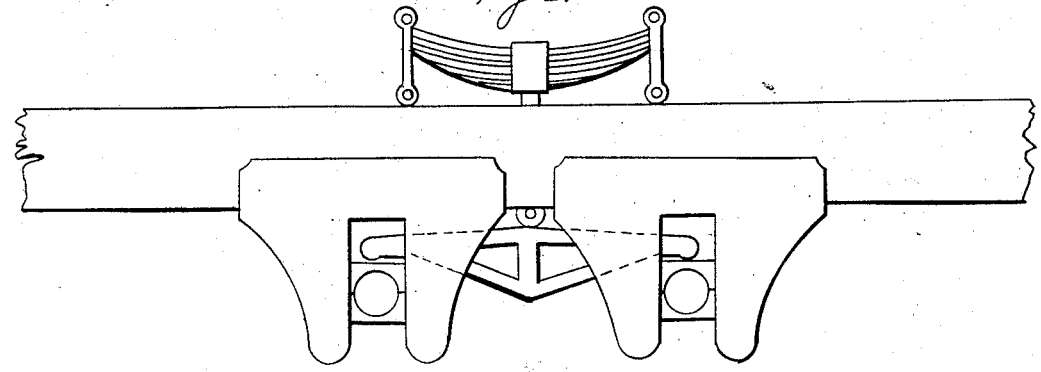

The arrangement shown in Fig. 4 bears the same relationship to that shown in Fig. 3 as that which subsists between the arrangement in Figs. 2 and 1, and need not, therefore, be described.

By these or analogous modes of construction the difficulty of obtaining a perfectly-equable bearing of the two wheels on one side of a car or carriage is overcome; but in truck-frames which turn on a center for the purpose of adapting the wheels to the curvations of a road, I have, in order to render the system of the equalization of the pressure of the wheels upon the road perfect, so constructed the frames of such trucks as that their sides shall not necessarily continue in the same plane, but be allowed to vibrate vertically to such extent as may be requisite to enable them to adapt themselves and the wheels which they sustain to any horizontal inequality in the rails upon which they are to run, as this cannot be effected by the limited action of springs.

Figure 5:
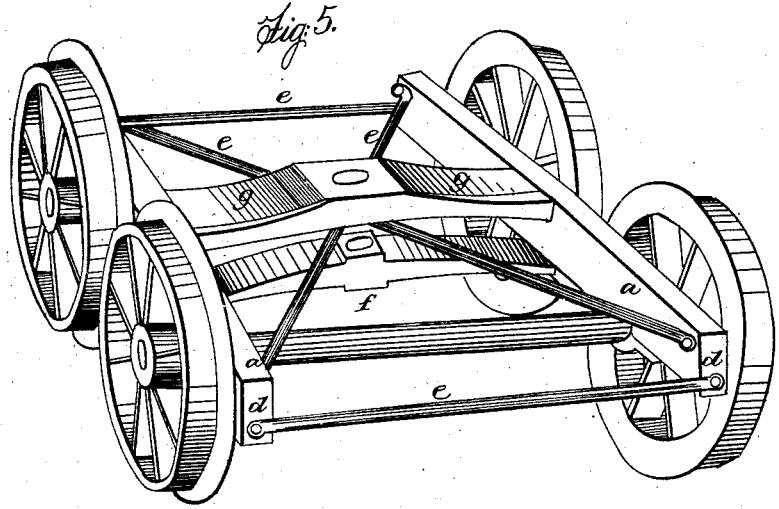

Fig. 5 represents a truck-frame arranged in such a manner as to fulfill this intention. The two sides of the frame $a\,a$ are connected together at their ends by the cross-bars or rods $c\,c$, which are attached to the side pieces by round bolts $d\,d$, upon which the said cross-bars can turn to a certain extent. Diagonal braces $e\,e$ are also attached to the side pieces by bolts or otherwise, so as to allow the same kind of play which is allowed to the bars $c\,c$. These diagonal braces not only preserve the parallelism of the side pieces, but also keep the sides and ends in a rectangular position without in any way interferring with the requisite horizontal vibrations of the sides. A separate spring may be used for each wheel, but I in general use a single spring $f\,f$, the ends of which are attached to the sides of the frame to sustain the pressure of the load, allowing the center pin to have its bearing on said spring. A cross-bar $g\,g$, the ends of which vibrate on the frame, has the center pin passing through it. The boxes in which the axles of the wheels run may be made to vibrate, so that the motion of the sides will not be impeded. I have thus particularly described one mode in which a truck-frame may be constructed, so as to admit of the required vibration of its side pieces. It, however, will be evident to every competent workman that the mode in which a frame possessed of this property may be put together are indefinitely numerous, while they will be substantially the same, as they will produce the same effects by analogous means.

What I claim as my invention in the within- described modes of constructing cars, carriages, or trucks to run upon railroads, is—

1. The constructing of the springs and their appendages so that said springs may vibrate upon their centers for the purpose substantially in the manner set forth under the description referring to Figs. 1 and 2.

2. The carrying out of the same principle by means of a vibrating beam or any anologous contrivance connected and arranged so as to produce the same effect, as exemplified in Figs. 3 and 4.

3. The use of a truck-frame which may be employed with cars and locomotive-carriages of all kinds to run upon railroads when trucks are required, said truck-frame being constructed in such a way as that the two parallel sides thereof may be allowed to play in the manner and for the purpose set forth, whether the same be put together in the method herein made known or in any other by which the same end is attained on the same principle.

JOSEPH HARRISON, JR.

Witnesses:
    JACOB NOLLNER,
    B. H. MORSELL.